Figure 2:
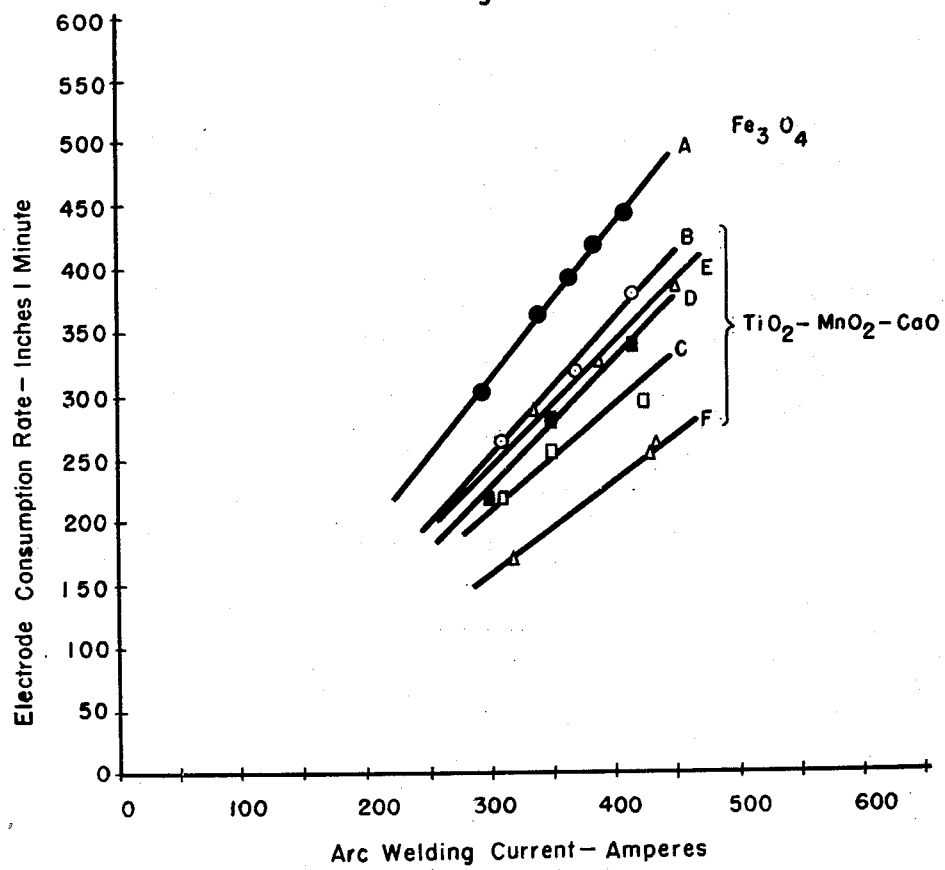

Dec. 31, 1957   H. C. LUDWIG   2,818,353
ELECTRIC ARC WELDING ELECTRODE
Filed July 6, 1954

WITNESSES:

INVENTOR
Howard C. Ludwig.
BY
ATTORNEY

United States Patent Office 2,818,353
Patented Dec. 31, 1957

2,818,353

ELECTRIC ARC WELDING ELECTRODE

Howard C. Ludwig, Pittsburgh, Pa., assignor to Westinghouse Electric Corporation, East Pittsburgh, Pa., a corporation of Pennsylvania Application July 6, 1954, Serial No. 441,534

3 Claims. (Cl. 117—205)

My invention relates to electric arc welding and has particular relation to welding electrodes or welding rods.

This application is a continuation-in-part of my applications Serial No. 286,348, filed May 6, 1952 for Automatic Inert Gas Arc Welding Process, and Serial No. 324,473, filed December 6, 1952 for A Coated Arc Welding Electrode Wire, and an application Serial No. 432,958, filed May 28, 1954 to Julius Heuschkel and me for Welding Electrodes, all assigned to Westinghouse Electric Corporation. The above-identified applications relate to arc welding with a consumable electrode in an atmosphere of an inert gas. Welding of this type is particularly applicable to automatic or semi-automatic metal arc welding, and my invention is particularly concerned with such welding at straight polarity with a ferrous consumable electrode having an arc stabilizing coating.

In welding, in accordance with the teachings of the prior art with an arc between an electrode free of any arc-stabilizing coating or deposit in a commercially pure inert gas atmosphere, and in welding, in accordance with certain aspects of my application Serial No. 286,348, a composite atmosphere consisting of an inert gas and oxygen, it has been found that the distribution of the heat energy developed by the arc between the arc anode and the arc cathode is not uniform. A large proportion of the heat energy of the arc is dissipated at the arc cathode; in fact, the heat energy of the arc dissipated at the arc cathode may be as much as 1.8 times the heat energy dissipated at the arc anode. This results in excessive melting of the welding electrode and insufficient penetration of the weld metal into the work if the welding is at straight polarity of excessive penetration of the weld metal into the work or even burning of the work if the welding is at reverse polarity.

It is, accordingly, broadly an object of my invention to provide a welding electrode in the use of which for arc welding, particularly in an inert gas atmosphere, the distribution of the heat energy of the arc between the arc anode and the arc cathode shall be so balanced as to produce sound welds having fillets of the proper dimensions and having the proper penetration.

A more specific object of my invention is to provide a ferrous welding electrode as just described, particularly suitable for welding at straight polarity.

My invention in its broader aspects arises from discoveries made by me in working with the electrode disclosed in my application Serial No. 324,473. The electrode disclosed in this application consists of a steel wire covered with a thin oxygen containing arc stabilizing coating or deposit. This coating may be composed of mixtures of such oxides or oxygen containing compounds as manganese dioxide, calcium oxide, titanium dioxide, cerium oxide, lithium carbonate, and also such compounds as calcium fluoride. In welding with the electrode disclosed in this application, I found that the balance of the heat energy between the arc anode and the arc cathode may be varied by changing the composition of the coating. I have further found that a coating consisting of titanium dioxide, manganese dioxide and calcium oxide (which is converted into calcium carbonate after the electrode is made) lends itself aptly to the variation of the balance of the heat energy between the anode and the cathode.

While sound welds are produced with electrodes of the type disclosed in my application Serial No. 324,473, it is desirable that the composition of the electrode coating be such as to yield the most propitious heat balance, and it is the basic concept of the invention disclosed in this application that such heat balance may be achieved with an electrode of the type disclosed in my application Serial No. 324,473.

Accordingly, a more specific object of my invention is to provide an electrode of the type disclosed in my application Serial No. 324,473 having a coating consisting essentially of titanium dioxide, manganese dioxide and calcium oxide in which the components shall be so related that in the use of the electrode in welding at normal and high speeds, a balance of arc heat energy between the arc anode and the arc cathode will be achieved which will result in welds of the highest quality having the proper fillet dimensions and penetration.

My invention arises from the discovery that the balance of arc heat distribution which yields high quality welds at normal and high speeds is achieved by properly proportioning the quantities by weight of titanium dioxide, manganese dioxide and calcium oxide in the coating. Specifically, I have found that a coating composition with the components essentially within the following ranges yields the desired heat balance:

| | Percent by weight |
|---|---|
| Titanium dioxide | 55 to 80 |
| Manganese dioxide | 10 to 30 |
| Calcium oxide | 10 to 35 |

The optimum results are obtained with a coating consisting of titanium dioxide 65%, manganese dioxide 20%, and calcium oxide 15% by weight.

Figure 1:
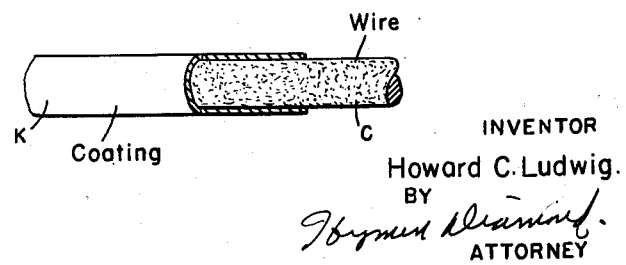

These coatings may be applied in the manner described in my application Serial No. 324,473. A slip is formed in which the components in powdered form and in the proportions just described are mixed with water, alcohol, or other readily evaporating medium. The wire is then roughened and coated with the slip with apparatus as shown in Fig. 1 of application Serial No. 324,473. The coating may also be applied in other ways, for example, my means of dies. In this case, the slip is sprayed on the wire and the wire bearing the slip is pulled through a series of (for example, three) dies of carballoy alloy of gradually decreasing internal diameter. The resulting coated wire is then pulled through a Venturi tube, and while it is in the tube, compressed air is projected on the wire at an angle of 45° to blow away excess coating.

An essential feature of the electrode according to my invention in its specific aspects is that the coating or deposit is very thin. The word deposit to describe the coating is used advisedly to convey the concept of a very thin coating. What it is intended to convey is that the material of the coating lies in the valleys of the roughened surface of the wire and does not predominantly cover the wire as a whole.

I have made a large number of welds with a ferrous electrode having the above-described coating and have found that such welds are of high quality having the proper fillet dimensions and penetration.

The novel features that I consider characteristic of my invention are discussed generally above. The invention itself, both as to its organization and its method of operation, together with additional objects and advantages thereof, will be understood from the following description of a specific embodiment when read in connection with the accompanying drawing in which:

Figure 1 is a view partly in section showing the mechanical structure of an electrode constituting a preferred embodiment of my invention, and Fig. 2 is a graph showing the effects of various coatings of the type used in the practice of my invention.

The electrode shown in Fig. 1 includes a steel wire core C having a thin coating K. The coating K is composed essentially of a mixture of manganese dioxide, titanium dioxide, and calcium oxide mixed so that it is as homogeneous as practicable. My invention concerns itself with the specific ranges of each of these components which leads to high quality welds.

In arriving at my invention, I produced a large number of electrodes with different coatings, compared the arc heat distribution for the various electrodes and studied the welded fillets produced in each case. Specifically, I made and studied a large number of electrodes having a $\frac{1}{16}$ inch diameter core wire composed of Mayari–R wire sold by Bethlehem Steel Company which has the following composition:

|  | Percent |
|---|---|
| Carbon | .08 |
| Sulphur | .025 |
| Phosphorus | .056 |
| Manganese | .53 |
| Silicone | .22 |
| Chromium | .43 |
| Nickel | .32 |
| Copper | .39 |
| Iron | Remainder |

The electrodes had coatings as specified in the following table.

| Coating | Constituents, Percent by Wgt. | | | |
|---|---|---|---|---|
|  | $Fe_3O_4$ | $TiO_2$ | $MnO_2$ | CaO |
| A | 100 | | | |
| B | | 80.0 | 10.0 | 10.0 |
| C | | 66.7 | 16.7 | 16.6 |
| D | | 62.5 | 25.8 | 11.7 |
| E | | 55.0 | 30.0 | 15.0 |
| F | | 33.4 | 33.3 | 33.3 |

In this table, the left-hand column presents a series of identification letters for the different coatings and the other columns present the components of the coating. Coating A in this table is ferroso-ferric oxide. This coating was applied chemically, as disclosed in applications 286,348 and 324,473. The other coatings B through F are composed of different mixtures of titanium dioxide, manganese dioxide, and calcium oxide applied as disclosed in application 324,473. The coating on the wire was very thin, of the order of 10 milligrams per foot in the case of A, and 2 to 5 milligrams per foot for B through F.

Fig. 2 is a graph showing the different heat distributions at different welding current magnitudes for the electrodes in the table. In this graph, the electrode consumption in inches per minute is plotted vertically and the welding current in amperes is plotted horizontally. The welding which resulted in the graphs was carried out at straight polarity in an argon shield having a purity of 99.8%. The slopes of the curves A through F are a measure of the arc heat dissipated at the electrode and an increase measure of the extent of penetration of the weld metal into the work. The curves for coatings A and F represent the limitation of the heat distribution for the coating compositions in table A. The maximum heat was dissipated at the electrode with coating A, and the minimum heat with coating F. It follows that there was minimum penetration of the work for coating A and the maximum penetration for coating F.

A study of the fillets produced with these electrodes reveals that to produce high quality welds the components of the coating must be maintained between the extremes of A and F. The high heat distribution at the cathode which yields a low penetration is unsatisfactory because the penetration is inadequate, and also because the electrode material is deposited at too high a rate. The lowest heat distribution at the cathode is unsatisfactory because it results in an excess penetration into the work or even burning and also in low speed welding.

My study also revealed that, while each of the components of the coating reacts on and cooperates with the other, each predominates in a different effect. The manganese dioxide dissociates at a relatively low temperature, and the dissociation appears to stabilize the arc. The titanium dioxide and the calcium oxide dissociate at a much higher temperature than the manganese dioxide but to the extent that they do dissociate they aid the manganese dioxide in stabilizing the arc. The titanium dioxide is in addition an effective slip agent and facilitates the application of the oxides to the core C. The calcium oxide to a large extent determines the heat distribution of the arc. I found that an increase in the calcium oxide content increases the weld penetration and conversely decreases the arc electrode consumption rate, and a decrease in the calcium oxide has an opposite effect. But the calcium-oxide component which can be included in the coating to achieve high penetration is limited by its effect on the arc. I found that if the coating content is in excess of 35% calcium oxide by weight it produced erratic welding arcs probably because of the excess of water which is absorbed in the coating by the calcium-oxide. Titanium dioxide also has the effect of increasing the penetration and decreasing the heat consumption at the welding electrode as its relative weight in the coating increases, but the effect of the titanium dioxide for this purpose is less marked than the effect of the calcium oxide. The manganese dioxide has less effect on the arc energy distribution than titanium dioxide or calcium oxide, but does improve the quality of the weld.

From my study, it appears that high quality welds are produced at a reasonable high speed with an electrode having a coating K consisting essentially of titanium dioxide between 55 and 80% by weight, manganese dioxide between 10 and 30% by weight, and calcuim oxide between 10 and 35% by weight and preferably consisting essentially of titanium dioxide 65% by weight, manganese dioxide 20% by weight, and calcium oxide 15% by weight. In producing the electrode, the wire is roughened by a surface conditioner, such as sandblasting apparatus, which produces very fine irregularities. Thus, when the roughening is produced by sandblasting, the roughening material is preferably No. 60 Alundum grit. On the roughened surface, the coating is applied as a very thin layer of the order of a few milligrams per foot of wire. Specifically, in an electrode which I produced with steel core having a diameter of .062 inch, the coating was 2 to 5 milligrams per foot.

The components of the coating on the wire which are used in the practice of my invention are in reasonably pure form. Specifically, the manganese dioxide used in making satisfactory welding electrodes in accordance with my invention was purchased from Fisher Scientific Company, of Pittsburgh, Pennsylvania, and in one case was Fisher Scientific Company Lot No. 520,063 labeled by Fisher as having an 85% assay. An analysis of this material revealed that its water content was 14.6% by weight. In addition, it included the following impurities:

| | |
|---|---|
| Magnesium, silicon, cobalt | between .02 and .2%. |
| Iron, aluminum | between .01 and .1%. |
| Titanium | between .005 and .5%. |
| Nickel | between .001 and .01%. |

The composition given for this material by Fisher itself was as follows:

| | Percent |
|---|---|
| Components insoluble in acid | .21 |
| Chloride components (anion) | .02 |
| Sulphate components (anion) | .32 |
| Alkali and alkaline earth components | 1.5 |

The calcium oxide was Fisher Scientific Company Catalogue No. C116 T. P. E. and A. reagent. This material when analyzed was found to have the following components in addition to the calcium oxide:

| | Percent |
|---|---|
| Precipitated components insoluble in acetic acid and ammonium hydroxide | .1 |
| Components lost on ignitron during analysis including those lost from chemical reaction from moisture which was driven off and chemical reactions | 10 |
| Chloride components (anion) | .005 |
| Nitrate components (anion) | .01 |
| Sulphate components (anion) | .08 |
| Alkaline earth components such as magnesium oxide | .65 |
| Heavy metal components such as lead | .005 |
| Iron | .015 |
| Zinc | .015 |

The calcium oxide as described above was mixed in the slip. This material absorbs water and is converted into calcium carbonate. The actual material in the coating of the electrode is probably then calcium carbonate.

The titanium dioxide used was bought from Fisher Scientific and is Fisher Catalogue No. T315 labeled anhydrous chemically pure. My experience with this material leads me to the conclusion that it is about 95.0% pure.

My study of the fillets produced with the electrodes having the coatings specified above has led to the conclusion that high quality fillets are produced. Such high quality welds were produced not only with the electrode having the Mayari–R wire core and the above-described coating, but also with the electrodes having cores of the different compositions described in my application Serial No. 432,958.

While I have shown and described certain specific embodiments of my invention, many modifications thereof are possible. My invention, therefore, is not to be restricted except insofar as is necessitated by the spirit of the prior art.

I claim as my invention:

1. A ferrous welding electrode particularly for welding at straight polarity in an atmosphere of substantially pure inert gas consisting of a steel wire having a diameter of the order of .062" and having an arc stabilizing coating characterized by the fact that the quantity of material in the coating is small, of the order of 2 to 5 milligrams per foot of electrode and the coating consists essentially of 55 to 80% by weight titanium dioxide
10 to 30% by weight manganese dioxide
10 to 35% by weight calcium oxide (carbonate).

2. A ferrous welding electrode particularly for welding at straight polarity in an atmosphere of substantially pure inert gas consisting of a steel wire having an arc stabilizing coating consisting essentially of 55 to 80% by weight titanium dioxide
10 to 30% by weight manganese dioxide
10 to 35% by weight calcium oxide (carbonate)

the quantity of material in the coating being small, of the order of a few milligrams per foot of electrode, said quantity being just sufficient to stabilize the arc.

3. A ferrous welding electrode particularly for welding at straight polarity in an atmosphere of substantially pure inert gas consisting of a steel wire having an arc stabilizing coating consisting essentially of titanium dioxide about 65% by weight, manganese dioxide about 20% by weight and calcium oxide (carbonate) 15% by weight, the quantity of material in the coating being small, of the order of a few milligrams per foot of electrode, said quantity being just sufficient to stabilize the arc.

References Cited in the file of this patent

UNITED STATES PATENTS

| | | |
|---|---|---|
| 1,374,711 | Armor | Apr. 12, 1921 |
| 2,005,902 | Mathias | June 25, 1935 |
| 2,102,891 | Faulkner | Dec. 21, 1937 |
| 2,694,763 | Muller | Nov. 16, 1954 |
| 2,694,764 | Muller | Nov. 16, 1954 |

FOREIGN PATENTS

| | | |
|---|---|---|
| 417,195 | Great Britain | Oct. 1, 1934 |
| 619,763 | Great Britain | Mar. 15, 1949 |